United States Patent

[11] 3,625,620

[72] Inventor Herbert E. Goldberg
 Concord, Mass.
[21] Appl. No. 66,572
[22] Filed Aug. 24, 1970
[45] Patented Dec. 7, 1971
[73] Assignee American Optical Corporation
 Southbridge, Mass.
 Continuation of application Ser. No.
 704,309, Feb. 9, 1968. This application
 Aug. 24, 1970, Ser. No. 66,572

[54] REFRACTOMETER
 16 Claims, 15 Drawing Figs.
[52] U.S. Cl. .................................................... 356/135
[51] Int. Cl. ............................................... G01n 21/46
[50] Field of Search ......................................... 356/135,
 128

[56] References Cited
 UNITED STATES PATENTS
 2,619,003 11/1952 Polanyi ........................ 356/135

| 3,006,241 | 10/1961 | Marks et al. ............. | 350/193 X |
| 3,267,795 | 8/1966 | Goldberg .................. | 356/137 |
| 3,279,309 | 10/1966 | Goldberg .................. | 356/135 |
| 3,329,060 | 7/1967 | Holleran ................... | 356/135 |

FOREIGN PATENTS

| 604,469 | 7/1948 | Great Britain ............... | 356/135 |

Primary Examiner—Ronald L. Wibert
Assistant Examiner—T. Major
Attorneys—William C. Nealon, Noble S. Williams, Robert J. Bird and Bernard L. Sweeney ABSTRACT: There is disclosed a critical-angle hand refractometer for measuring the refractive index of an unknown substance by the position of the edge of a shadow (optical image). The refractometer comprises refracting means to linearize the refractometer scale and temperature compensating means which effect a temperature compensation by a rectilinear displacement of the scale or the objective lens of the refractometer without altering the magnification of the optical system of the refractometer.

INVENTOR.
HERBERT E. GOLDBERG
BY Hame and Bayley
ATTORNEYS

INVENTOR.
HERBERT E. GOLDBERG
BY Hane and Bayley
ATTORNEYS

REFRACTOMETER

This application is a continuation of my copending application, Ser. No. 704,309, filed Feb. 9, 1968.

This invention is concerned with systems of correcting the temperature error of refractometers, particularly of so-called critical-angle hand refractometers. It is also concerned with means to modify the nonlinearity of refractometer scales in order to improve the accuracy of reading at the low portion of the scale and to increase the range of reading of the instrument.

Critical-angle refractometers are instruments with which the refractive index or related characteristics of unknown substances may be measured by reading on a divided scale the position of the edge of a shadow, sometimes called the optical image. The principle of operation of such refractometers is described in detail in textbooks and in the patent literature, e.g., in U.S. Pat Nos. 2,619,003, 3,267,795, 3,279,309, which also relate to the temperature error of refractometric measurements and ways of correcting it. It has been stated in these patents that the rate of displacement of the optical image, which occurs as the temperature of measurement changes, is not the same at all points of the scale. Because of this, it has been thought impossible heretofore to correct the temperature error by a simple displacement of the refractometer scale with respect to the optical image—except in the case of refractometers having unusually narrow ranges of measurement.

The systems, which have been proposed in the aforementioned patents to correct the temperature error, comprise devices for adjusting either the magnification of the refractometer or the effective size of the scale in accordance with temperature changes. The system described in U.S. Pat. No. 3,267,795 employs a fixed compensator prism cut of a special material which changes refractive index as a function of temperature. Since the optical effect produced by a given index change depends on the angle of incidence of the light beam forming the optical image, proper compensation may be obtained at several points of the refractometer scale by selecting the orientation of the compensator as explained in the aforementioned patent. The variable index system of temperature compensation does not comprise moving elements. It is very stable and is widely used in the industry, even though variable index prisms are costly to produce.

Another system described in U.S. Pat. No. 3,279,309 relies on a compensator lens or prism which is rotated about a transverse axis by a thermally responsive actuator. The optical effect caused by a given rotation again depends on the angle of incidence, and correct compensation of several points of the scale is again obtained by proper orientation of the compensator in the optical path, which in this case, however, changes with temperature. Since the orientation of the prism also controls the overall magnification of the optical system, it must be adjusted carefully at the factory. If it is not set properly, or if it changes in the course of time, large errors of reading will appear at the high end of the scale, even if the setting of the zero point is correct. The moving compensator type of instrument must, hence, be checked periodically and adjusted if necessary, using standard solutions of both low and high index.

The need for periodic checks of the reading at the high end of the scale is a serious disadvantage of the moving prism compensator as compared with the variable index type because standard aqueous solutions of high index are likely to change with time. Test prisms, on the other hand, must be used at certain well defined temperatures since their temperature coefficients are always much lower than those for which the compensation system of the refractometer was designed.

If either the high or the low reading is faulty, the compensator orientation as well as the position of the scale with respect to the image must be reset. Since both adjustments are interdependent, adjustment is very difficult to perform unless specialized test fixtures are available. It is for this reason that the moving prism type of compensators has been restricted to industrial refractometers requiring only a limited accuracy of reading.

It is a broad object of the present invention to provide a system of temperature compensation which employs a simple rectilinear displacement of the refractometer scale, or of the optical image. It thus functions without altering the magnification of the optical system. Such system has the advantage of the variable index system in that the entire instrument calibration is determined by the setting of the zero point of the scale and can be verified by checking it on any other single point. It is, however, much more flexible in design, less costly to construct, and perhaps sturdier in use.

Other objects, features and advantages of the invention will be pointed out hereinafter and set forth in the appended claims constituting part of the application.

In the accompanying drawing several embodiments of the invention are shown by way of illustration and not by way of limitation.

Figure 1:
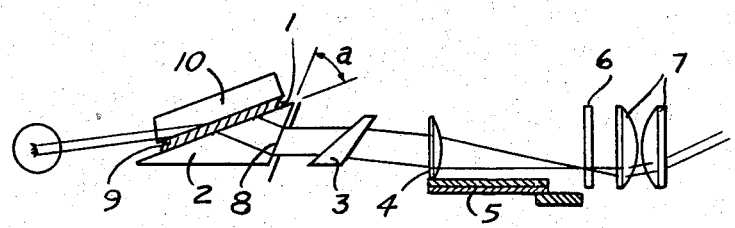
FIG. 1 is a schematic view of the optical system of a critical-angle refractometer according to one form of the invention.

Referring now to FIG. 1, it is not considered necessary to explain here the path of the light rays and the way the optical image is formed and may be observed through an eyepiece 7, since this is well known to those skilled in refractometry. Attention is drawn to the fact that the measuring prism 2 and the magnitude of the refracting angle $a$ of this prism are entirely conventional. The substance to be measured is indicated at 9. A cover plate 10 is preferably placed upon the substance. It is customary in the design of hand refractometers to select angle $a$ so that the refraction at the exit face 8 is in the opposite direction from that taking place at the entrance face 1, so as to compensate all or most of the color dispersion which occurs at the entrance face, at least for the midpoint of the refractometer scale. Accordingly, the exact value of angle $a$ depends on the dispersion of the solutions to be measured and on the type of glass of which the measuring prism is cut; it is usually between 30° and 60°.

The purpose of a stationary refracting means shown as a fixed prism or wedge 3, on the other hand, is not conventional, but is an element of one embodiment of the invention.

Exit face 8 of prism 2 may also function in a similar way as a stationary refracting means under certain conditions as will be explained more fully hereinafter.

Figure 10:
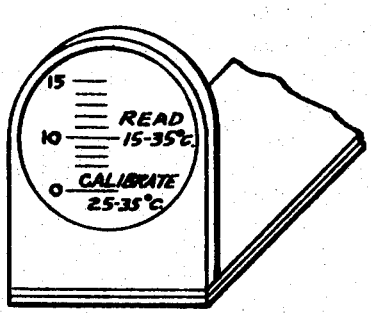
FIG. 10 shows a type of the refractometer scale which is useful in many practical applications.

A thermal actuator 5 also forms part of the invention as it pertains to temperature compensation. As shown, it causes displacement between the optical image and the reticle 6 by raising or lowering the objective lens 4 in accordance with temperature changes. The reticle may carry a scale 6a with a base line 6b, constituting a reference mark as shown in FIG. 10. In an alternate but equivalent embodiment of the invention, it may displace the reticle 6 instead of the objective lens. In other embodiments of the invention, a thermal activator may cause the required displacement in other well-known ways, for instance, by rotation of a plane parallel plate positioned in the light path.

The functioning of temperature compensators according to the invention may be clarified by introducing the concept of "escalation." Suppose that the scale or reticle of the refractometer reads in units of $q$ where $q$ may be the refractive index, percent sucrose, degrees freezing point depression, or any other quantity to be measured. Suppose further that $s$ is the distance between the point of reading $q$ and the point $q_o$ at the base line of the scale, $s = f(q)$. The "escalation" of the spacing $ds/dq$ of the refractometer scale divisions between points $q$ and $q_o$ is represented by $(e_{ds/dq}) q, qo$:

$$(e_{ds/dq})_{q,qo} = (ds/dq)_q / (ds/dq)_{qo}$$

The escalation of the scale measures its departure from linearity. It is larger than unity for expanding scales and smaller for the compressed type. The nonlinearity at any point of the scale may also be measured by the second derivative $d_2s/dq^2$ prevailing at that point.

Similarly, one may define the escalation of the temperature change $dq/dt$ of the reading $q$ as $$(e_{dq/dt})_{q,qo} = (dq/dt)_q / (dq/dt)_{qo}$$

and the escalation of the motion of the refractometer shadow with temperature $ds/dt$ $$(e_{ds/dt})_{q,qo} = (ds/dt)_q / (ds/dt)_{qo}$$

Temperature compensation may be obtained at two points, $q$ and $q_o$, of the scale by a straight line displacement of the scale with respect to the image, if $ds/dt$ is the same at these two points.

$$(ds/dt)_q = (ds/dt)_{qo} \quad 1.$$

or $$(e_{ds/dt})_{q,qo} = 1 \quad 1a.$$

An inclined auxiliary prism or wedge such as wedge 3 may be positioned between the measuring prism 2 and the refractometer scale 6 to introduce an escalation factor smaller than unity and thus to reduce the total system escalation. For instruments covering unusually broad ranges of measurement, a combination of both methods may be employed.

Since $e_{ds/dt} = e_{ds/dq} \times e_{dq/dt}$  2.

We have by substitution in (1a):

$$(e_{ds/dq})_{q,qo} \times (e_{dq/dt})_{q,qo} = 1$$

$$(e_{ds/dq})_{q,qo} = 1/(e_{dq/dt})_{q,qo} \quad (3)$$

Equation (3) means that the escalation of the refractometer scale must be inversely proportional to that of the temperature coefficient of the materials to be measured. The last column of table 1 lists typical values of the scale escalation required to satisfy equation (3) for a sucrose refractometer.

TABLE 1

| 1 | 2 | 3 | 4 |
|---|---|---|---|
| $q$ | $dq/dt$ | $(e_{dq/dt})_{q,qo}$ | $(e_{ds/dq})_{q,qo}$ |
| % Sucrose | %/°C. | | |
| $q_o =$ 0 | 0.070 | 1.0 | 1.00 |
| 8 | 0.072 | 1.03 | 0.97 |
| 15 | 0.075 | 1.07 | 0.94 |
| 30 | 0.077 | 1.10 | 0.91 |
| 50 | 0.080 | 1.14 | 0.88 |
| 75 | 0.080 | 1.14 | 0.88 |

The data shown later in this specification demonstrate that the sucrose scale escalations listed in column 4 of table 1 are obtainable for instance by combining a measuring prism 2 of large refracting angle $a$ and escalation of 1.2 with an inclined fixed wedge 3 of escalation 0.75. Actually, such an elaborate system is non needed, because conditions encountered in practice are less severe. Indeed, the data given in manufacturers' catalogues show that all commercially available systems of temperature compensation produce perfect results only at two points of the scale, and that small residual errors remain at all other points. If similar errors were permitted in the system disclosed herein, the compensation required at various scale points would not have to match precisely the temperature error of the solution at those points, but could be allowed to vary between certain limits, defined for each point by:

4.  $(dq/dt)$ compensation = $(dq/dt)$ mat. $\pm (dq/dt)$ allowable error where "mat." is material to be measured.

$$(5) \quad (e_{dq/dt}) \text{ compensation} = \frac{[(dq/dt) \text{mat.} \pm (dq/dt) \text{ allowable error}]_q}{[(dq/dt) \text{mat.} \pm (dq/dt) \text{ allowable error}]_{qo}}$$

Depending on which of the error signs is chosen, equation (5) defines four different values for $(e_{dq/dt})$ compensation. If equations (3) and (5) are combined and if the positive sign is used in the numerator, equation (6) is obtained. It may be used to calculate the maximum and minimum permissible escalation of the refractometer scale for the case where the most active possible compensator is employed.

$$(6) \quad (e_{ds/dq}) \text{ most active} = \frac{[(dq/dt) \text{mat.} + (dq/dt) \text{ allowable error}]_{qo}}{\text{compensator}[(dq/dt) \text{mat.} \pm (dq/dt) \text{ allowable error}]_q}$$

Similarly, if the negative error sign is used in the numerator, limits of allowable scale escalation are found for the weakest possible compensator. The numerator being smaller in this case, the allowable scale escalation will be smaller also.

$$(7) \quad (e_{ds/dq}) \text{ least active} = \frac{[(dq/dt) \text{mat.} - (dq/dt) \text{ allowable error}]_{qo}}{\text{compensator }[(dq/dt) \text{mat.} \pm (dq/dt) \text{ allowable error}]_q}$$

The numerical data, which follow, will demonstrate that the concept expressed by equation (6) reduces demands on escalation significantly. The sucrose refractometer will be considered as a first example, because it is the standard laboratory instrument for the measurement of "soluble solids." Since the temperature changes in the refractive index are almost entirely due to thermal expansion of the solvent, the figures are valid not just for sucrose, but for aqueous solutions of most inorganic compounds as well.

As a second example, an ethylene glycol refractometer will be analyzed in order to demonstrate the advantages of the invention for industrial instruments which require limited accuracy but must function over a wider range of temperature changes.

1. Sucrose Refractometers.

Figure 2:
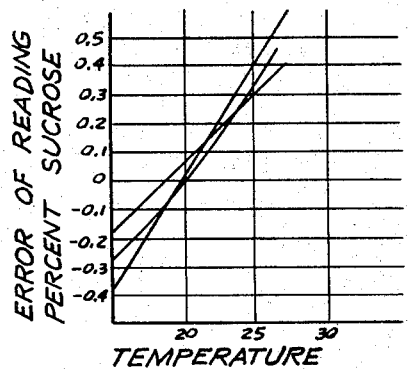
FIG. 2 shows the temperature error which is committed when a 10 percent sucrose solution is read with a conventional uncompensated refractometer.

Subsequent table 2 gives estimates of residual temperature errors of sucrose refractometers allowable for laboratory and for industrial use. The table also lists the temperature coefficients $dq/dt$ for several concentrations of solution, and the maximum and minimum $dq/dt$ which the compensator must supply at each concentration to keep the residual errors within the specified limits. Since the temperature coefficient of sucrose solutions below 25 percent is a function of temperature as well as concentration, equation (4) cannot be used in these cases. $(dq/dt)$ must then be found by the graphical method illustrated in FIG. 2. In this FIG., the temperature error of reading has been plotted against temperature for a 10 percent sucrose solution. The slope of the curve is therefore equal to $(dq/dt)$ solution. Two straight lines have been drawn, having the highest and lowest slope possible without departing from the curve by more than the allowable error. The slope of these lines is $(dq/dt)$mat$\pm(dq/dt)$ allowable error and has been entered in columns 5 and 6 of Table 2.

TABLE 2

Column: Quantity shown
1....... Concentration.
2....... $(dg./dt.)_{Material}$.
3....... Allowable error for laboratory service.
4....... Allowable error for industrial service.
5....... $(dg./dt.)_{Compensator}$ for laboratory service.
6....... $(dg./dt.)_{Compensator}$ for industrial service.
7....... Allowable escalation for laboratory service.
8....... Allowable escalation for industrial service.

| 1 | 2 | 3 | 4 | 5 | | 6 | | 7 | | 8 | |
|---|---|---|---|---|---|---|---|---|---|---|---|
| | | | | Percent °C. | | | | eds./dq. | | | |
| Percent | Percent °C. | Max. | Min. | Max. | Min. | Max. | Min. | Max. | Min. | Max. | Min. |
| 0 | (¹) | .007 | .010 | .076 | .065 | .070 | .060 | 1.00 | 1.00 | 1.00 | 1.00 |

TABLE 2—Continued

Column: Quantity shown
1....... Concentration.
2....... (dg./dt.)$_{Material}$.
3....... Allowable error for laboratory service.
4....... Allowable error for industrial service.
5....... (dg./dt.)$_{Compensator}$ for laboratory service.
6....... (dg./dt.)$_{Compensator}$ for industrial service.
7....... Allowable escalation for laboratory service.
8....... Allowable escalation for industrial service.

| 1 | 2 | 3 | 4 | 5 | | 6 | | 7 | | 8 | |
|---|---|---|---|---|---|---|---|---|---|---|---|
| | | | | Percent ° C. | | | | eds./dq. | | | |
| Percent | Percent ° C. | | | Max. | Min. | Max. | Min. | Max. | Min. | Max. | Min. |
| 10 | (¹) | .007 | .010 | .080 | .070 | .085 | .066 | 1.09 | .95 | 1.20 | .92 |
| 15 | (¹) | .007 | .012 | .082 | .070 | .086 | .063 | 1.09 | .93 | 1.25 | .90 |
| 30 | .076 | .010 | .015 | .086 | .066 | .091 | .061 | 1.15 | .88 | 1.30 | .87 |
| 50 | .080 | .015 | .020 | .095 | .065 | .100 | .060 | 1.19 | .80 | 1.32 | .79 |
| 75 | .080 | .020 | .025 | .100 | .060 | .105 | .055 | 1.26 | .76 | 1.43 | .75 |

¹ See text.

Figure 3:
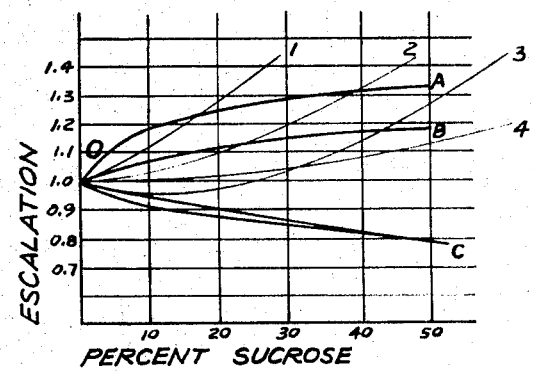
FIG. 3 illustrates the degree of temperature compensation of the sucrose refractometer obtainable with various optical systems.

The data shown in columns 7 and 8 of the table have been calculated from equation (6) and plotted in FIG. 3. The curves OA, OB and OC of that FIG. delineate the ranges of the overall instrument scale escalation which permit temperature compensation by simple displacement between the scale and the image.

The area AOC determines escalation for industrial service, while the more restricted contour BOC applies to laboratory service.

Similar contours could be calculated according to equation (7). They would apply to the least active compensators that can be used. They are of little practical interest, however, because of the heavy demands they make on escalation.

The escalation curve of a conventional hand refractometer is represented by curve 1 in FIG. 3. This curve applies to all such instruments because escalation does not depend greatly on the refractive index of the measuring prism. The reason is that measuring prisms of high refractive index also have higher dispersion. They generate less escalation of the entrance face, but increased chromatic aberration, which must be compensated by increased reverse refraction of the exit face. This in turn brings total escalation to the level characteristic of low index prisms.

FIG. 3 demonstrates that the temperature error of conventional hand refractometers can be compensated by simple displacement of the scale with respect to the image for a sucrose range from 0–5 percent in case of laboratory service, and up to 15 percent for industrial uses. These ranges clearly are too narrow. Escalation must be reduced in order to extend them, and this may be accomplished by inserting the special stationary refracting means as discussed before into the system.

Figure 4A:
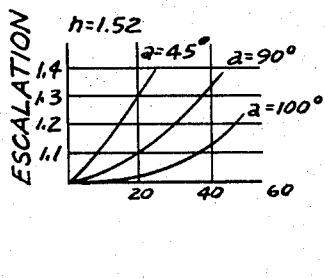
FIGS. 4a, 4b and 4c illustrate the reduced nonlinearity of refractometer scales depending on the design of the measuring prism.
Figure 4B:
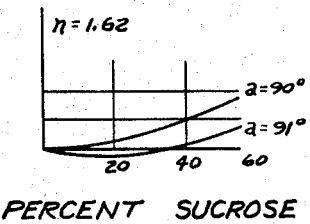
Figure 4C:
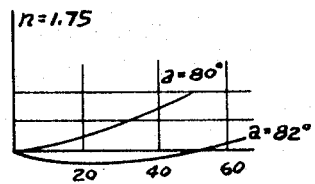

FIGS. 4a, 4b and 4c show escalation curves for sucrose refractometers, employing measuring prisms of large refracting angles. Data are included for refractive indices of $n=1.52$, $n=1.62$ and $n=1.75$. Several prism angles $a$ were chosen for each index, beginning with the angle that would reduce the escalation to 1.2 for the 0–30 percent range, and going to the largest angle that would limit the angle of refraction at the exit face to 75°.

The 45°-curve in FIG. 4a represents a conventional hand refractometer prism and has been included for comparison.

Figure 5:
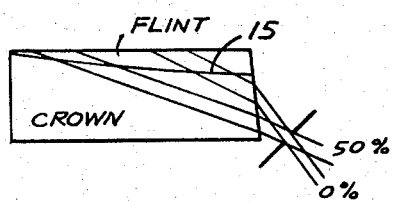
FIG. 5 illustrates a composite measuring prism of large prism angle, designed to be achromatized at three points of the scale.

Prisms of large refracting angles generate, of course, substantial chromatic aberration. They must be achromatized, for instance, by splitting them into Flint-Crown assemblies according to FIG. 5 which shows such a prism having a refracting angle $a$ larger than 90°. If the glasses are chosen such as to have the same index for the D line, a spherical interface 15 may be employed to achromatize the assembly at three points of the refractometer scale without introducing astigmatism.

The foregoing data demonstrate that sucrose scales may be linearized over extended ranges by increasing the refracting angle of the measuring prism to at least 75°, depending on its refractive index. The angle must be large enough to cause the refraction at the exit face to be in the same direction as that produced at the measuring face. The linearizing effect is achieved by the expansion of the low end of the scale. The field angle of the instrument is, hence, increased and the telescope magnification needed for proper viewing of the scale is reduced.

Escalation can be reduced also by utilizing the optical distortion generated by decentered lenses, separate additional prisms, or inclined wedges. Consider the wedge B shown in FIG. 6. The angular deviation $x$ (FIG. 6) suffered by a light ray passing through it depends on its refractive index and the refracting angle, as well as the angle of incidence. Deviation is at a minimum when angles of incidence $i_1$ and or refraction $r_2$ are equal. However, the magnification $dr/di$ does not pass through a minimum, but increases continuously from zero to infinity as angle $i_1$ decreases from +90° to the angle at which angle $r_2$ reaches 90°. FIG. 7 shows the magnification as a function of angle of incidence. The portions of the curve which are of greatest interest for the present purpose correspond to angles of incidence comprised between −50° to −20° and between +40° and +75° respectively.

Figure 6:
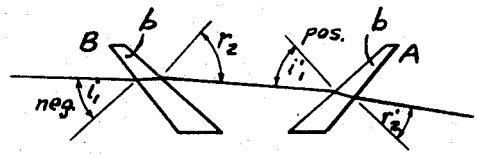
FIG. 6 shows a dual inclined wedge optical system for reducing the nonlinearity of the refractometer scale.
Figure 7:
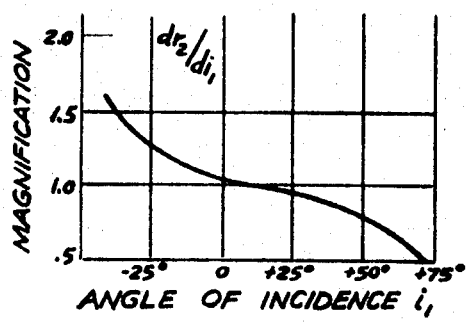
FIGS. 7 and 8 illustrate optical characteristics of inclined wedge systems.

Positive angles of incidence correspond to the orientation of wedge A of FIG. 6. The magnification is smaller than unity and decreases as the angle of incidence increases. Such a wedge could compress the high end of a refractometer scale and reduce the field angle. The configuration of prism B represents negative angles of incidence. In this case magnification is above unity and the wedge acts to expand the low end of a refractometer scale. The combination A and B shown in the FIG. will then affect both ends of the range, reducing escalation without altering the field angle greatly. A similar result may be achieved by pairing a wedge using positive angles of incidence with one of the measuring prisms of large refracting angle described previously.

Figure 8:
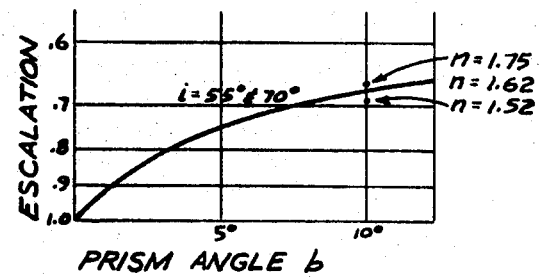

FIG. 8 shows the escalation characteristics of wedge prisms as a function of the prism angle $b$. Angles of incidence of +55° and +70° have been used in this example to represent a typical 0–50 percent sucrose refractometer having a field angle of 15°.

It is seen from the FIG. that escalation does not change greatly after the wedge prism angle exceeds 10° or 15°. The curve has been drawn for a wedge prism index of 1.62, but two points representing indices of 1.52 and 1.75 have been included for the 10-degree prism angle to demonstrate that the wedge escalation is nearly independent of index. This is an important point, because it allows the designer to minimize chromatic aberration by employing glasses of low dispersion.

Calculations show, for instance, that a 10° wedge made of 1.52/64 glass produces about 2 minutes of chromatic aberration for a 60°-angle of incidence. Such a color band can be corrected easily, either by adjusting the refracting angle $a$ of the measuring prism, or by following the procedure described in U.S. Pat. No. 3,267,795. This involves the use of a decentered objective lens generating 0.145° of paraxial and 0.015° of lateral color.

The considerations expressed above may be summarized by suggesting the following designs for sucrose refractometers of reduced escalation:

TABLE 3

| Range percent sucrose | 0-20 | 0-50 | 0-75 |
|---|---|---|---|
| Measuring prism | Composite | Single | Composite. |
| Flint glass and angle | 1.517/52, −16° | None | 1.755/77, −19°. |
| Crown glass and angle | 1.517/70, +112° | 1.57/56, +41% | 1.755/47, +100°. |
| Interface | Flat | | Curved. |
| Wedge glass and angle | None | 1.520/64, 10° | None. |
| Wedge incidence for 0% beam | | −44° or +63° | |
| Residual color | ±10° | 0.14°±0.01° | |
| Field angle | 90 | 20° or 6.3° | 23°. |
| Objective lens 1.75/27 prism angle | 80 mm./none | 90 mm./4.7° pr | 30 mm./none. |
| Stop position in front of objective | 48 mm | 2 mm. or 6 mm | At crown. |
| Scale interval (40 micron spacing) | 0.1% | 0.2% | 0.25%. |
| Scale length | 12 mm | 10 mm | 12 mm. |
| Eye piece magnification | 10x | 10x | 10x. |
| Scale escalation | 1.10 | 1.27 | 1.23. |

The table shows that optical systems of low escalation result in short and easily readable refractometer scales and that the entire 0 to 75 percent sucrose range may be covered by a single instrument which may be read to 0.25 percent at moderate magnification.

Escalation curves for these three instruments and for a conventional hand refractometer are shown in FIG. 3. They demonstrate that temperature compensation is possible by a simple displacement of the scale with respect to the image (vice versa) for the following ranges of measurement:

| | | Range— | |
|---|---|---|---|
| Curve Number | Type of prism system | Industrial service, percent | Laboratory service, percent |
| 1 | 1.517 conventional a=40° | 0-15 | 0-5 |
| 2 | 1.517 flint-crown a=96° | 0-35 | 0-25 |
| 3 | 1.575 single crown a=41° and 10° wedge. | 0-65 | 0-50 |
| 4 | 1.755 flint-crown a=81° | 0-75 | 0-75 |

Figure 9A:
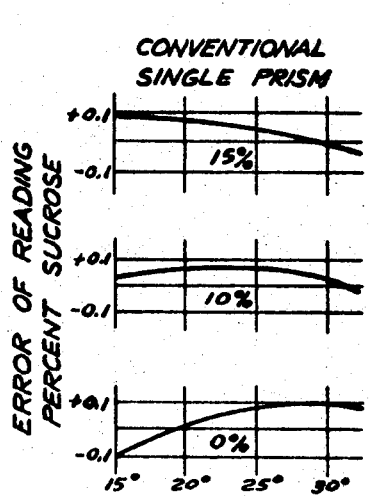
FIGS. 9a, 9b and 9c show the residual temperature errors of sucrose refractometers with various optical systems.
Figure 9B:
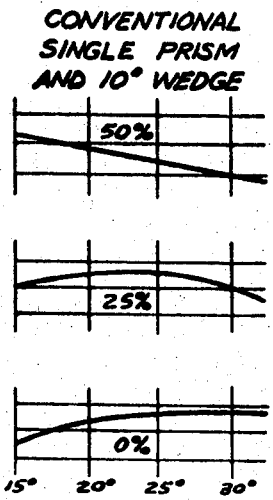

The escalation curves 1, 2, 3 and 4 are positioned for the most part well within the areas AOC and BOC and touch the boundaries only at the extreme end of the refractometer range, where the instrument is seldom used. For the great majority of applications the compensation is, hence, well within the tolerances specified in table 2. As an example, the actual performance of systems No. 1 and 3 have been computed and plotted in FIGS. 9a and 9b. It has been assumed that both systems have been fitted with a thermal actuator 5 according to FIG. 1, displacing the scale by 0.076 percent sucrose division for each degree C. temperature change, measured near the zero point of the scale. Similar results would be obtained with systems No. 2 and 4. All compare favorably with error data of temperature compensation systems presently commercially available.

Figure 9C:
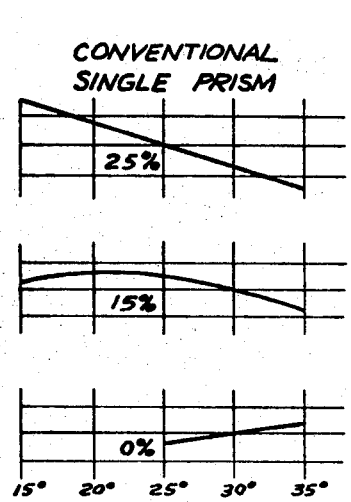

The performance of these systems can be improved further, however, if it is considered that pure water is never measured but serves only as a medium for calibration. Taking advantage of the fact that the $dq/dt$ curve for water is a straight line above 25° C., the reticle could be designed with divisions between 0 and 7 percent omitted, and carrying a notation instructing the user to adjust the zero line at an instrument temperature comprised between 25° and 35° C. This implies no inconvenience, since water of this temperature will be available wherever calibration work is done. FIG. 9c, for instance, indicates the excellent results that may be obtained with the single prism instrument if the reticle pattern shown in FIG. 10 is employed in conjunction with an actuator displacing the scale by 0.084 percent sucrose per degree C. temperature change, measured near the zero point of the scale.

2. Ethylene Glycol Refractometers

The quantity measured in the ethylene glycol (or "glycol") refractometer is the freezing point of cooling solutions used for instance in the radiators of internal combustion engines. The accuracy of measurement required in this application is only moderate, perhaps of the order of 0.002 refractive index units, but there is a great need for temperature compensation nevertheless, because of the widely varying climatic conditions under which the instruments are used. Ambient temperatures may range, for instance, from +35° C. down to the freezing point of the solution that is checked. For practical purposes, the range is somewhat more limited, because it may be assumed that solutions of very low freezing point are not usually measured during the summer months, or above +20° C., and that −25° C. is the lowest instrument temperature at which accurate readings can be taken, even in winter time.

The temperature coefficient $dq/dt$ of the quantity measured by the glycol refractometer is the change in the freezing point, read in degrees C., which is caused by changes of the temperature at which the reading is taken, also expressed in degrees C.

Table 4 lists the data which are required for an analysis of the problem. Column 4 shows the temperature ranges at which glycol solutions of various strengths may be assumed to be handled, and column 6 the maximum errors permitted at the extremes of these ranges. Column 5 gives the temperatures at which the position of the respective scale points should be calculated, so that there will be no error at those temperatures. Measurements may, of course, be made at temperatures beyond the limits set in column 4, but at a penalty of larger errors.

The last column of the table shows the errors per degree temperature change, that would be allowable within the specifications set in columns 4 and 6. All temperatures and errors are in degrees C.

TABLE 4

| 1 | 2 | 3 | 4 | 5 | 6 | 7 |
|---|---|---|---|---|---|---|
| Ratio solute to solvent | Index | Freezing point depression | Temperature range | Cal. temperature | Max. error allowable | Max. error per ° C. temperature change |
| Percent: | | | | | | |
| 0 | 1.333 | 0 | +35−+10 | +22.5 | ±0.5 | ±0.04 |
| 15 | 1.349 | −7 | +35−−5 | +15.0 | ±0.5 | ±0.025 |
| 33 | 1.368 | −18 | +30−−15 | +7.5 | ±0.8 | ±0.035 |
| 44 | 1.379 | −29 | +25−−25 | 0 | ±1.0 | ±0.04 |
| 53 | 1.387 | −40 | +20−−25 | −2.5 | ±1.25 | ±0.055 |
| 56 | 1.391 | −45 | +20−−25 | −2.5 | ±1.25 | ±0.055 |

The action of compensator which is required to reduce the temperature error to the limits set in table 4 is determined again by equation (4).

The limits within which compensation must be generated are shown in table 5, column 4. The maximum and minimum permissible escalations of $(dq/dt)_{compensation}$ which results, are listed in column 5. They have been computed according to equation (5) with reference to the −7 point of the scale, rather than the zero point, in order to avoid the ambiguities which would otherwise be created by the fact that no compensation at all, or even negative compensation, is acceptable at the zero point of the particular instrument.

TABLE 5

Column: Quantity shown
1. Freezing point.
2. (dg./dt.)$_{solution}$.
3. Allowable error per degree temperature change.
4. Compensation required.
5. Escalation of the required compensation calculated relative to the −7° C. scale point.
6. Allowable scale escalation relative to the −7° C. scale point.

| 1 | 2 | 3 | 4 | | 5 | | | | 6 | | | |
|---|---|---|---|---|---|---|---|---|---|---|---|---|
| | | | °C./°C. | | Most active comp. 0.090 | | Least active comp. 0.040 | | 0.090, °C./°C. comp. | | 0.040, °C./°C. comp. | |
| °C. | °C./°C. | | Max. | Min. | Max. | Min. | Max. | Min. | Max. | Min. | Max. | Min. |
| − | .030 | .040 | .070 | .010 | .78 | 0 | 1.75 | 0 | 1.28 | | .57 | |
| −7 | .065 | .025 | .090 | .040 | 1.00 | .44 | 2.25 | 1.00 | 1.00 | 2.25 | .44 | 1.00 |
| −18 | .130 | .035 | .165 | .095 | 1.83 | 1.05 | 4.13 | 2.38 | .54 | .95 | .24 | .41 |
| −20 | .228 | .040 | .268 | .188 | 3.0 | 2.1 | 6.7 | 4.7 | .33 | .48 | .15 | .21 |
| −40 | .305 | .055 | .360 | .250 | 4.0 | 2.8 | 9.0 | 6.25 | .25 | .36 | .11 | .16 |
| −45 | .330 | .055 | .385 | .275 | 4.3 | 3.05 | 9.65 | 6.9 | .23 | .33 | .10 | .14 |

Figure 11:
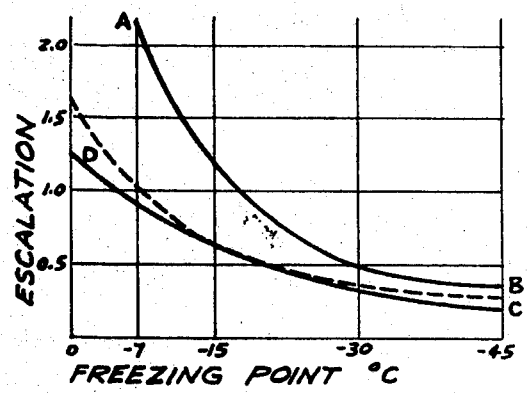
FIG. 11 is a chart similar to FIG. 3 but designed to illustrate the type of temperature compensation obtainable for an ethylene glycol refractometer.

The scale escalations $ds/dt$, which are shown in column 6, have been calculated according to equation (6) and have been plotted in FIG. 11. Any refractometer with an escalation curve that lies entirely within the area ABCD, will be compensated against temperature changes within the specifications given in Table 4, if the compensator has an activity of $dg/dt=0.090°$ C./° C. at the −7° C. point of the scale. This is the highest activity possible. The escalation curve for a refractometer system composed of a 41° single prism and a 10° linearizing wedge has been entered in dotted outline. It is seen that this system meets the specifications set in table 4. It would perform even better if the tolerance area ABCD were shifted downward slightly by recomputing the data of columns 5 and 6 of table 5 for a slightly less active compensator with an activity at the −7° C. point of 0.08° C. freezing point reading per degree C. temperature change.

What is claimed is:

1. A refractometer operating with a source emitting bundles of light and having a measuring prism with an entrance face to receive different substances within a range of characteristics to be measured corresponding to refractive indices $n$, an objective having an image plane, a reticle disposed in said image plane and carrying a scale having a reference mark, said entrance face and said reticle being positioned in such a way that bundles of light from said source are refracted and deviated at said entrance face and directed to said objective, and focused by said objective to an optical image on said scale at a distance $s$ from said reference mark, $ds/dn$ being the rate of change in said distance $s$ with said refractive index $n$, and $d_2s/dn^2$ being the nonlinearity of said rate of change in combination with:

stationary refracting means positioned between said entrance face and said reticle, said stationary refracting means deviating said bundles of light by angles of deviation $x$, $dx/dn$ being the rate of change of said angles of deviation with said refractive index $n$ to be measured, said stationary refracting means being oriented so that $dx/dn$ decreases as $n$ increases thereby causing a reduction of said nonlinearity $d_2s/dn^2$, said stationary refracting means being constituted by an exit face of said measuring prism, said exit face producing a deviation of said bundles of light in the same direction as the deviation of the bundles of light at said entrance face.

2. A refractometer according to claim 1 wherein said measuring prism has a refractive index below 1.62 and a prism refracting angle larger than 90°.

3. A refractometer according to claim 1 wherein said measuring prism has a refractive index above 1.62 and a prism refracting angle larger than 75°.

4. A refractometer according to claim 1 wherein said measuring prism is composed of at least two components having different optical dispersion.

5. A refractometer according to claim 4 wherein said components have substantially the same refractive index for one line of the spectrum and are separated by curved faces.

6. A refractometer operating with a source emitting bundles of light and having a measuring prism with an entrance face to receive different substances within a range of characteristics to be measured corresponding to refractive indices $n$, an objective having an image plane, a reticle disposed in said image plane and carrying a scale having a reference mark, said entrance face and said reticle being positioned in such a way that bundles of light from said source are refracted and deviated at said entrance face and directed to said objective, and focused by said objective to an optical image on said scale at a distance $s$ from said reference mark, $ds/dn$ being the rate of change of said distance $s$ with said refractive index $n$, and $d_2s/dn^2$ being the nonlinearity of said rate of change in combination with;

stationary refracting means positioned between said entrance face and said reticle, said stationary refracting means deviating said bundles of light by angles of deviation $x$, $dx/dn$ being the rate of change of said angles of deviation with said refractive index $n$ to be measured, said stationary refracting means being oriented so that $dx/dn$ decreases as $n$ increases thereby causing a reduction of said nonlinearity $d_2s/dn^2$, said stationary refracting means including a fixed prism having refracting faces and being positioned between said measuring prism and said reticle.

7. A refractometer according to claim 6 wherein said fixed prism is oriented so that the angle of incidence of said bundles of light at at least one of said faces is positive and comprised between 40° and 75°.

8. A refractometer according to claim 6 wherein said fixed prism is oriented so that the angle of incidence of said bundles of light at at least one of said faces is negative and comprised between 20° and 50°.

9. A refractometer operating with a source emitting bundles of light and having a measuring prism with an entrance face to receive different substances within a range of characteristics to be measured corresponding to refractive indices $n$, said refractive indices varying with temperature changes, an objective having an image plane, a reticle disposed in said image plane and carrying a reference mark, said entrance face and said reticle being positioned in such a way that bundles of light from said source are refracted and deviated at said entrance face and directed to said objective, and focused by said objective to an optical image on said reticle at a distance $s$ from said reference mark, $ds/dn$ being the rate of change of said distance $s$ with said refractive index $n$, and $d_2s/dn^2$ being the nonlinearity of said rate of change in combination with:

temperature compensating means compensating for the temperature error resulting from the temperature coefficient of the refractive index of said different substances to be measured, said temperature compensating means comprising a thermal actuator to move one of said objective and said reticle so as to cause displacement between said optical image and said reference mark in accordance with temperature changes, and stationary refracting means positioned between said entrance face and said reticle, said stationary refracting means deviating said bundles of light by angles of deviation $x$, $dx/dn$ being the rate of change of said angles of deviation with said refractive index $n$ to be measured, and being oriented so that $dx/dn$ decreases as $n$ increases thereby causing a reduction of said nonlinearity $d_2s/dn^2$, the stationary refracting means being constituted by an exit face of said measuring prism, said exit face producing a deviation of said bundles of light in the same direction as the deviation of the bundles of light at said entrance face.

10. A refractometer according to claim 9 wherein said measuring prism has a refractive index below 1.62 and a prism refracting angle larger than 90°.

11. A refractor according to claim 9 wherein said measuring prism has a refractive index above 1.62 and a prism refracting angle larger than 75°.

12. A refractometer according to claim 9 wherein said measuring prism is composed of at least two components having different optical dispersion.

13. A refractometer according to claim 9 wherein said components have substantially the same refractive index for one line of the spectrum and are separated by curved faces.

14. A refractometer operating with a source emitting bundles of light and having a measuring prism with an entrance face to receive different substances within a range of characteristics to be measured corresponding to refractive index $n$, said refractive indices varying with temperature changes, an objective having an image plane, a reticle disposed in said image plane and carrying a reference mark, said entrance face and said reticle being positioned in such a way that bundles of light from said source are refracted and deviated at said entrance face and directed to said objective, and focused by said objective to an optical image on said reticle at a distance $s$ from said reference mark, $ds/dn$ being the rate of change of said distance $s$ with said refractive index $n$, and $d_2s/dn^2$ being the nonlinearity of said rate of change in combination with:

temperature compensating means compensating for the temperature error resulting from the temperature coefficient of the refractive index of said different substances to be measured, said temperature compensating means comprising a thermal actuator to move one of said objective and said reticle so as to cause displacement between said optical image and said reference mark in accordance with temperature changes, and stationary refracting means positioned between said entrance face and said reticle, said stationary means deviating said bundles of light by angles of deviation $x$, $dx/dn$ being the rate of change of said angles of deviation with said refractive index $n$ to be measured, and being oriented so that $dx/dn$ decreases as $n$ increases thereby causing a reduction of said nonlinearity $d_2s/dn^2$, the stationary refracting means including a fixed prism having refracting faces and being positioned between said measuring prism and said reticle.

15. A refractometer according to claim 14 wherein said fixed prism is oriented so that the angle of incidence of said bundles of light at at least one of said faces is positive and comprised between 40° and 75°.

16. A refractometer according to claim 14 wherein said fixed prism is oriented so that the angle of incidence of said bundles of light at at least one of said faces is negative and comprised between 20° and 50°.

* * * * *